United States Patent [19]

Ulbrich

[11] 4,185,353
[45] Jan. 29, 1980

[54] WIPING ARRANGEMENT FOR WIPING A VEHICLE WINDOW, AND A METHOD OF MANUFACTURING THE SAME

[75] Inventor: Gerhard Ulbrich, Buehl, Fed. Rep. of Germany

[73] Assignee: Robert Bosch GmbH, Stuttgart, Fed. Rep. of Germany

[21] Appl. No.: 904,582

[22] Filed: May 10, 1978

[30] Foreign Application Priority Data

Jul. 20, 1977 [DE] Fed. Rep. of Germany ....... 2732759

[51] Int. Cl.² .................................................. B60S 1/38
[52] U.S. Cl. ................................................ 15/250.36
[58] Field of Search ........................ 15/250.36–250.42; 264/303, 305, 308, 340, 167; 427/400

[56] References Cited

U.S. PATENT DOCUMENTS 1,796,926  3/1931  Geyer .............................. 15/250.36

Primary Examiner—Peter Feldman
Attorney, Agent, or Firm—Michael J. Striker

[57] ABSTRACT

A wiping arrangement for wiping a vehicle window has an elongated wiping element turnable about an axis and arranged to contact the vehicle window during such turning so as to wipe the same. The wiping element has a coefficient of friction which differs in the direction of elongation thereof. In accordance with a method of manufacturing the arrangement, a coefficient of friction which differs in the direction of elongation of the wiping element is imparted to the latter. The coefficient of friction of the wiping element may differ from one to another end of the latter in a stepped manner or in a stepless manner. The different coefficient of friction may be imparted to the wiping element by chlorinating of the latter so that different longitudinally spaced portions of the wiping element are exposed for contacting with chlorine during different times.

11 Claims, 4 Drawing Figures

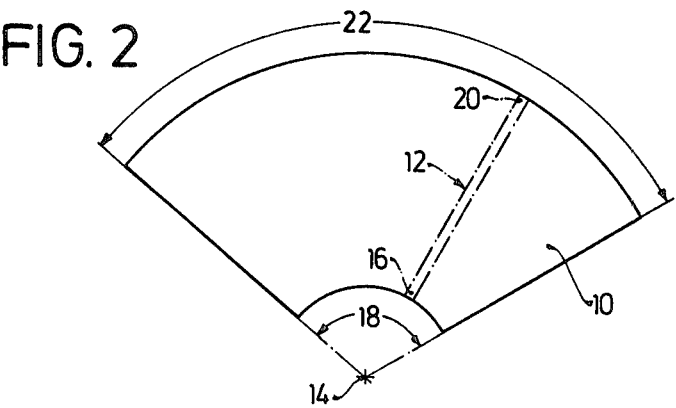
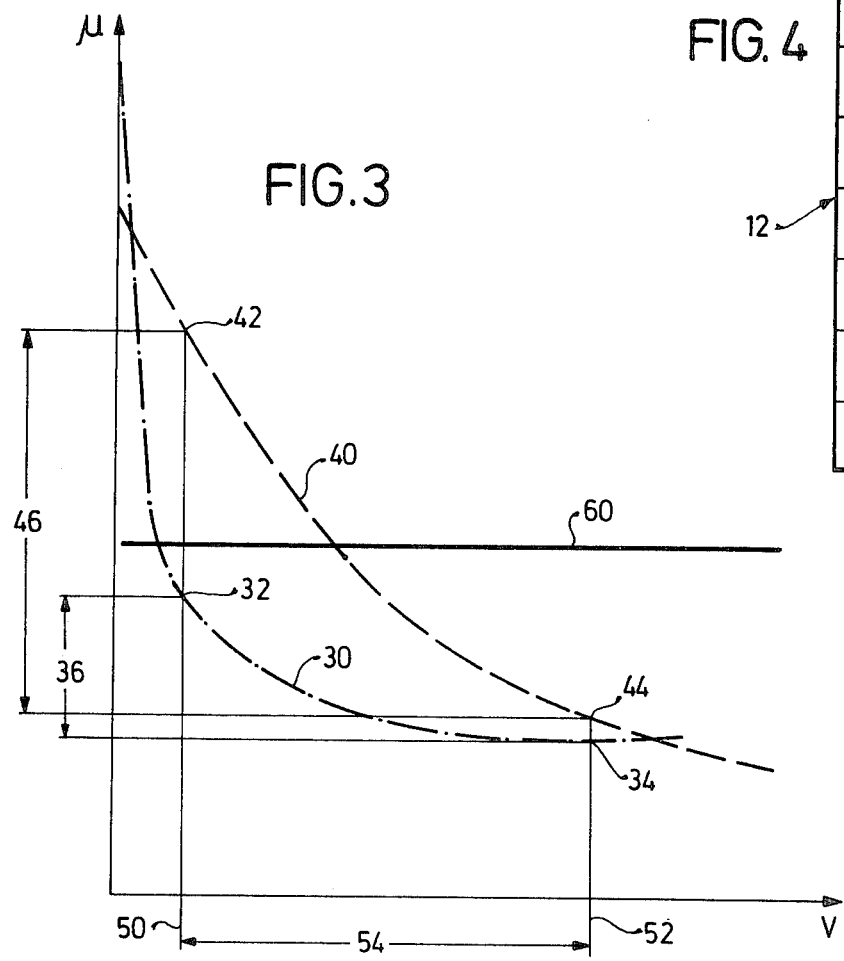

WIPING ARRANGEMENT FOR WIPING A VEHICLE WINDOW, AND A METHOD OF MANUFACTURING THE SAME

BACKGROUND OF THE INVENTION

The present invention relates to an arrangement for wiping a vehicle window and a method of manufacturing the same.

Wiping arrangements have been proposed in the art in which a wiping element has a layer of a chlorinated rubber material. In this case, a coefficient of friction of the wiping element is reduced and thereby a friction force between the wiping element and the vehicle window is also reduced. In the operation of the wiping arrangement, however, different portions of the wiping element move at different speeds. It has been recognized that several factors influence the friction force between the wiping element and the vehicle window when the coefficient friction of the wiping element has a uniform magnitude. Such factors, besides of moisture characteristics of the vehicle window to be wiped, include the speed of movement of the wiping element, the pressure applied by the wiping element to the vehicle window which is not always uniform on the technical grounds, and the curvature of the vehicle window which varies from one vehicle to another. This results in a so-called stick-slip effect. This becomes apparent when one end of the wiping element or a wiping lip thereof becomes fixed to the vehicle window, whereas another end slides on the vehicle window. In this case, the wiping element operates with a chatter.

SUMMARY OF THE INVENTION

Accordingly, it is an object of the present invention to provide a wiping arrangement for wiping a vehicle window, which avoids the disadvantages of the prior art.

Another feature of the present invention is to provide a wiping arrangement, in accordance with which a uniform friction force between a wiping element and a vehicle window to be wiped is provided along the entire length of the wiping element, so that the latter is not subjected to chatter.

In keeping with these objects, and with others which will become apparent hereinafter, one feature of the present invention, briefly stated, resides in a wiping arrangement for wiping a vehicle window, which has an elongated wiping element turnable about an axis and arranged to contact the vehicle window during such turning so as to wipe the same, wherein the wiping element has a coefficient of friction which differs in the direction of elongation thereof. When for some reason a friction force between the wiping element and the vehicle window can vary in the direction of elongation of the wiping element, the provision of different coefficient of friction in this direction will assure that the above-mentioned friction form will be uniform lengthwise of the entire wiping element.

A method of manufacturing of the wiping arrangement in accordance with the present invention includes the step of imparting to the wiping element a coefficient of friction which differs in the direction of elongation thereof.

Another feature of the present invention is that the coefficient of friction of the wiping element may differ in a stepped manner from one to another end of the latter. The wiping element may have a plurality of portions spaced from one another in a direction from one to the other end, and each of these portions have a coefficient of friction which differs from the coefficient of friction of another of these portions. The portions may be uniformly distributed over the wiping element and may have similar dimensions.

Still another feature of the present invention is that the coefficient of friction of the wiping element may gradually differ from one to the other end thereof. A further feature of the present invention is that in accordance with the proposed method the imparting step includes chlorinating the wiping element so that different longitudinally spaced portions of the latter are exposed to contacting the same with chlorine during different times so as to vary the coefficient of friction of the wiping element.

In accordance with a still further feature of the present invention the exposing step includes immersing the wiping element in a chlorine bath and subsequently removing the wiping element from the chlorine bath so that intensity of chlorination of the wiping element differs in the direction of elongation thereof.

An additional feature of the present invention is that the removing step may include removing the wiping element from the chlorine bath in a stepped manner or in a stepless manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 2 is a schematic view showing a wiping element of the wiping arrangement, which performs oscillating movements so as to wipe a vehicle window;

FIG. 3 is a friction force-speed diagram for differently treated wiping elements; and FIG. 4 is a schematic view showing the wiping element in accordance with one of the embodiments of the present invention.

DESCRIPTION OF THE PREFERRED EMBODIMENTS

Figure 1:
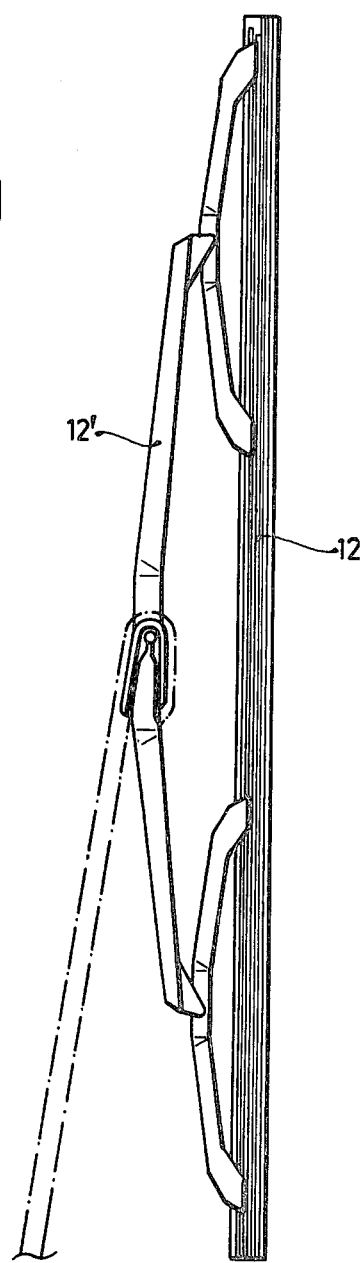
FIG. 1 is a view showing an arrangement for wiping a vehicle window.

A wiping arrangement for wiping a vehicle window has a turnable arm 12' which supports a wiping element 12. As shown in FIG. 2, the wiping element 12 oscillates about an axis or a center 14 so as to cover a wiping field identified by reference numeral 10. The wiping element 12 has an end 16 facing toward the center 14, and an end 20 spaced from the end 16 in the direction of elongation of the wiping element 12 and facing away from the center 14.

The end 16 of the wiping element 12 passes through a curved distance 18, whereas the end 20 of the wiping element 12 passes through the curved distance 22. As can be seen from FIG. 2, the distance 22 is significantly greater than the distance 18. Therefore the end 16 of the wiping element 12 moves at a speed which substantially differs from the speed at which the end 20 of the wiping element 12 moves.

In a diagram presented in FIG. 3 the abscissa represents a speed of movement of the wiping element V, whereas the ordinate represents a friction force between the wiping element and the vehicle window to be wiped, $F_r$.

A dot-dash curve 30 in the diaphragm shows the friction force-speed relationship for a fully untreated wiping element. It can be seen that the friction force in a start-up period of the operation of the wiping arrangement is very high, and thereupon it decreases fast with increase of the speed until it becomes of an approximately equal magnitude.

A second dashed curve 40 shows friction force-speed relationship for a wiping element which is treated by a respective substance uniformly over the entire length of the wiping element. It can be seen that the friction force in such a wiping element in the start-up period is substantially smaller than that of the untreated wiping element. The curve 40 extends significantly flatter than the curve 30 and substantially varies through a greater speed region. Vertical lines 50 and 52 correspond to speeds of the ends 16 and 20 of the wiping element 12, respectively.

The friction force of the wiping element 12 is the following:

The speed line 50 intersects the curve 30 in a point 32, whereas the speed line 52 intersects the curve 30 in a point 34. A friction force differential between the ends 16 and 20 of the wiping element 12 which is not treated corresponds to the distance 36 measured lengthwise of the ordinate between the points 32 and 34. The vertical lines 50 and 52 intersect the curve 40 which represents the friction-speed relationship for the uniformly treated wiping element 12, in points 42 and 44. A friction force differential for the thus-treated wiping element 12 corresponds to a distance 46 measured lengthwise of the ordinate between the points 42 and 44. It can be seen that the friction force differential 46 for the uniformly treated wiping element is greater than the friction force differential 36 for the untreated wiping element. The uniformly treated wiping element having such location and dimension of the speed region 54 relative to the friction force differential as shown in FIG. 2, is less favorable than the fully untreated wiping element. Thus, it is believed to be clear that the uniformly treated wiping element possesses the same disadvantages as the fully untreated wiping element.

In accordance with the present invention, the wiping element 12 has a coefficient of friction which differs in the direction of elongation of the wiping element. The difference of the coefficient of friction in the direction of elongation of the wiping element can be so selected that the friction force between the wiping element 12 and the vehicle window to be wiped is identical for all the points of the wiping element 12. The friction force for such a wiping element is shown by a line 60 in FIG. 3. As can be clearly seen from this line, the friction force remains identical independently of the speeds at which different portions of the wiping element 12 oscillate.

The friction coefficient of the wiping element 12 may differ from the end 16 to the end 20 of the wiping element in a stepped manner as shown in FIG. 4. For instance, several portions may be provided in the wiping element 12, each of which has a friction coefficient differing from the friction coefficients of the other portions. Such portions may be uniformly distributed in the direction of elongation of the wiping element 12 and may have identical dimensions. It is also possible that the friction coefficient of the wiping element 12 differs from the end 16 to the end 20 of the wiping element 12 in a stepless manner.

In order to impart the differing friction coefficient to the wiping element 12 or wiping lips which may be constituted by a rubber material, the same may be chlorinated. The chlorination is performed in a very specific manner. Intensity of the chlorination is varied so that the coefficient of friction of the wiping element differs in the direction of elongation thereof. The wiping element is fully immersed in a chlorine bath and thereafter pulled out of the latter so as to provide a predetermined differential of the coefficient of friction in the direction of elongation of the wiping element. The wiping element may be pulled out from the chlorine bath in a stepped manner or in a stepless manner as to provide a stepped or stepless differential of the coefficient of friction of the wiping element 12 in the direction of elongation thereof, respectively.

Taking into consideration the factors which influence the friction force between the wiping element 12 and the vehicle window to be wiped, for instance the speed of movement of the wiping element, the pressure applied by the latter to the vehicle window to be wiped, and the curvature of the vehicle window, the end portion 16 of the wiping element 12, in one case, and the end portion 20 of the wiping element, in other cases, may be more intensively chlorinated than the end portion 20 and the end portion 16 of the wiping element 12, respectively.

It will be understood that each of the elements described above, or two or more together, may also find a useful application in other types of constructions differing from the types described above.

While the invention has been illustrated and described as embodied in an arrangement for wiping a vehicle window, and a method for manufacturing the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be secured by Letters Patent is set forth in the appended claims:

1. A wiping arrangement for wiping a vehicle window, comprising an elongated wiping element turnable about an axis and arranged to contact the vehicle window during such turning so as to wipe the same, said wiping element being constituted of a material having a coefficient of friction which differs in the direction of elongation of said wiping element.

2. The arrangement as defined in claim 1; and further comprising turnable arm supporting said wiping element.

3. The arrangement as defined in claim 1, wherein said wiping element is constituted by a flexible rubber material.

4. The arrangement as defined in claim 1, wherein said wiping element has a surface member adapted to contact the vehicle pane and constituted by a material having a low friction coefficient, said surface layer being constituted by said material having said differing coefficient of friction.

5. The arrangement as defined in claim 1, wherein said wiping element has two ends spaced from one another in the direction of elongation thereof, said coefficient of friction of said material differing in a stepped manner from one of said ends to the other end.

6. The arrangement as defined in claim 5, wherein said wiping element has a plurality of portions spaced from one another in a direction from said one end toward said other end, each of said portions having a coefficient of friction which differs from the coefficients of friction of other of said portions.

7. The wiping arrangement as defined in claim 6, wherein said portions are uniformly distributed over said wiping element and have similar dimensions.

8. The arrangement as defined in claim 1, wherein said wiping element has two ends spaced from one another in the direction of elongation thereof, said coefficient of friction of said material gradually differing from one of said ends to the other end.

9. The arrangement as defined in claim 1, wherein said material of said wiping element includes a substance imparting a low friction coefficient thereto, a content of said substance in said material of said wiping element differing in the direction of elongation of said wiping element, whereby said coefficient of friction of said material differs in said direction.

10. The arrangement as defined in claim 1, wherein said wiping element is chlorinated so that the contents of chlorine differs in the direction of elongation of said wiping element whereby the coefficient of friction of the material of said wiping element differs in said direction.

11. The arrangement as defined in claim 1, wherein said wiping element has a uniform thickness over its entire length in said direction of elongation.

* * * * *